(12) United States Patent
Preschutti et al.

(10) Patent No.: US 6,208,833 B1
(45) Date of Patent: *Mar. 27, 2001

(54) ECHO CANCELLATION FOR A BROADBAND DISTRIBUTION SYSTEM

(75) Inventors: Joseph Paul Preschutti, State College; Ellwood David Nonnemacher, Bellefonte; Jeff Legg, State College, all of PA (US)

(73) Assignee: The Whitaker Corporation, Wilmington, DE (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/881,585

(22) Filed: Jun. 24, 1997

Related U.S. Application Data
(60) Provisional application No. 60/020,848, filed on Jun. 28, 1996.

(51) Int. Cl.[7] ............................................ H04N 7/16
(52) U.S. Cl. ................ 455/3.1; 348/8; 333/100; 455/304
(58) Field of Search .................. 348/6, 10, 8; 455/137, 455/139, 304, 303, 3.1, 4.1, 6.1; 333/100, 127, 128, 10, 161

(56) References Cited

U.S. PATENT DOCUMENTS

| | | | |
|---|---|---|---|
| 4,261,056 | * | 4/1981 | Barnett et al. ........................ 455/273 |
| 4,384,366 | * | 5/1983 | Kaitsuka ............................... 455/278 |
| 4,647,868 | * | 3/1987 | Mueller ................................. 330/286 |
| 5,126,704 | * | 6/1992 | Dittmer ................................ 333/125 |
| 5,430,568 | | 7/1995 | Little et al. ........................... 359/124 |
| 5,485,630 | | 1/1996 | Lee et al. .............................. 455/4.1 |
| 5,528,283 | | 6/1996 | Burton ................................... 348/13 |
| 5,640,213 | * | 6/1997 | Miyahara et al. .................... 348/726 |
| 5,828,273 | * | 10/1998 | Harrison ............................... 333/127 |
| 5,844,596 | * | 12/1998 | Goodman ............................... 348/14 |
| 5,898,454 | * | 12/1998 | Brickell .................................. 348/6 |
| 5,901,340 | * | 5/1999 | Flickinger et al. .................... 455/3.1 |

FOREIGN PATENT DOCUMENTS

| | | | |
|---|---|---|---|
| 0496422 A2 | 1/1992 | (EP) | ............................. G06F/3/14 |
| 2626119 A1 | 1/1988 | (FR) | ............................ H03H/11/04 |
| 2173077 | 3/1985 | (GB) | ............................. H04H/1/04 |
| 2178274 | 7/1986 | (GB) | ............................. H04H/1/02 |

OTHER PUBLICATIONS

PCT Patent Application No. WO97/01931, H04N 7/10, Jan. 1997.
International Search Report, PCT/US 97/11086, Nov. 1997, pp. 1 & 2.

* cited by examiner

Primary Examiner—Andrew I. Faile
Assistant Examiner—Reuben M. Brown

(57) ABSTRACT

A wideband signal distribution unit for receiving a plurality of inputs and having a plurality of outputs is provided. The distribution unit features a first combiner having an output and being connected to a first subset of the plurality of inputs. A second combiner having an output is connected to a second subset of the plurality of inputs. A phase shifting combiner having inputs each connected to the outputs of the first and second combiners supplies a combined signal to an output connected to a splitter which is connected to the plurality of signal distribution unit outputs. The phase shifting combiner is designed to apply a phase shift to one of its inputs.

3 Claims, 4 Drawing Sheets

ECHO CANCELLATION FOR A BROADBAND DISTRIBUTION SYSTEM

This application claim benefit to Provisional application Ser. No. 60/020,848 filed Jun. 28, 1996.

FIELD OF THE INVENTION

This invention is related to a broad band signal distribution system, and more particularly to echo cancellation in such a system.

BACKGROUND OF THE INVENTION

There are numerous instances where it is desired to distribute over wire within a relatively local area, such as a building, wideband signals modulated on to RF carriers. A particular application is the distribution of video signals. For example, a school may have a number of classrooms and administrative offices, each having a television monitor, and it may be desired at a given time to provide a program to all of the classrooms and offices, originating either from a source within one of the classrooms or offices, such as a VCR or from an outside source, such as a local cable system. Similarly, a corporation may have a building, or several closely spaced buildings, with numerous conference rooms equipped with television monitors and analogous program presentations may be desired. It is desirable in such a distribution system to have infrastructure which is relatively inexpensive and provides for easy expandability.

Since new construction is commonly prewired by the local telephone company using category 5 twisted pair cable, a system has been developed to distribute video or other wideband signals through this existing infrastructure. Such a system is disclosed in related patent applications Ser. Nos. 08/548,038 and 08/548,036 filed Oct. 25, 1995 respectively by the assignee hereof.

As shown in FIG. 1, the system consists of a distribution unit or a series of distribution units which may be cascaded to each other in a main wiring closet. These distribution units are connected via the category 5 twisted pair infrastructure to a plurality of outlets in different rooms. Each outlet may either be used as an input or an output. When used as an input, a baseband source signal such as one coming from a VCR is modulated and injected into the system through a breakout box having an enabling circuit which activates the input line. When used as an output, a monitor may be simply plugged into any wall outlet and tuned into the desired channel in order to receive the distributed program. This system is designed to support a plurality of channels in the frequency band of 7 Mhz to 211.25 Mhz.

The main component of this system is the distribution unit. FIG. 2 shows a block diagram of the distribution unit which includes the signal inlet, a signal outlet and switch means operable to either first state or a second state. When the switch means is in its first state, it couples the transmission path to the combiner and the splitter. When the switch means is in its second state, it couples the combiner to the signal outlet instead of to the transmission path and couples the splitter to the signal inlet instead of to the transmission path. This system may include several distribution units cascaded from each other as shown in FIG. 1 whereby one of the outlet ports of the first distribution unit is connected to the signal inlet of the second distribution unit and one of the input ports of the first distribution unit is connected to the signal outlet of the second distribution unit. The switch means of the first distribution unit is in its first state and the switch means of each of the cascaded distribution units are in a second state. The first distribution unit is therefore considered to be operating in the master mode and the subsequent cascaded distribution units are considered to be operating in the slave mode.

A problem exists in this system, however, in that unwanted signals result from crosstalk between the outbound signal path and inbound signal path at the connectors and other conductive and radiated sources within the distribution unit. The problem is increased due to the fact that the unwanted signals are coherently applied to the output connectors resulting in an in phase undesired signal appearing at all input connectors. The undesired signal is increased by combining eight separate undesired in phase signals at the combiner input.

SUMMARY OF THE INVENTION

It is an object of this invention to reduce the effects of crosstalk between outbound signal path and the inbound signal path in a distribution unit of a wideband signal distribution system. The object of this invention is achieved by providing a phase shifting combiner at the input to the distribution unit which has outputs that are 180° out of phase with each other resulting in a reduction in the power of unwanted crosstalk signals.

BRIEF DESCRIPTION OF THE DRAWINGS

The invention will now be described by way of example with reference to the following figures of which.

DETAILED DESCRIPTION OF THE INVENTION

Figure 1:
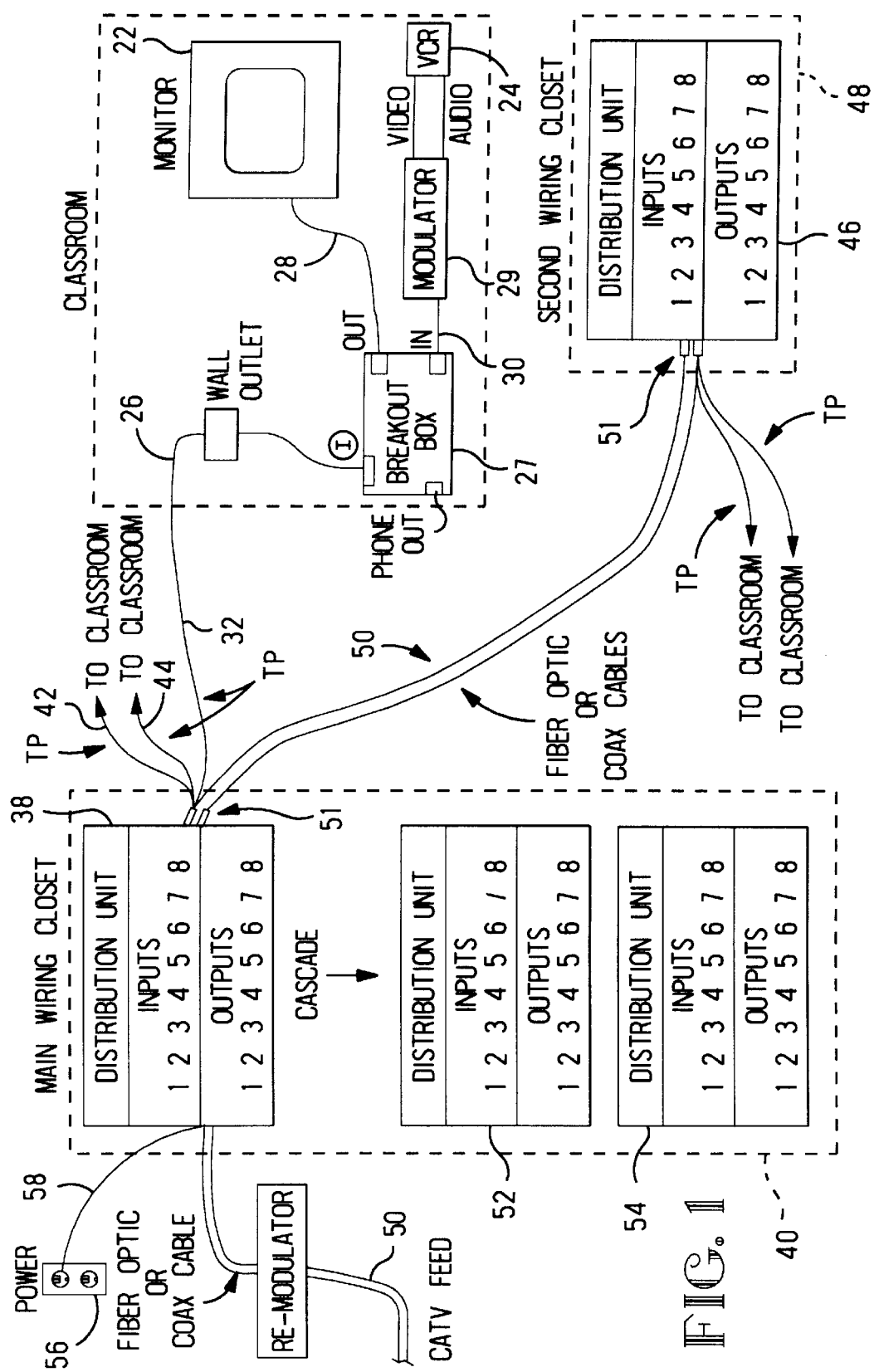
FIG. 1 shows a pictorial representation of the wideband signal distribution system.
Figure 2:
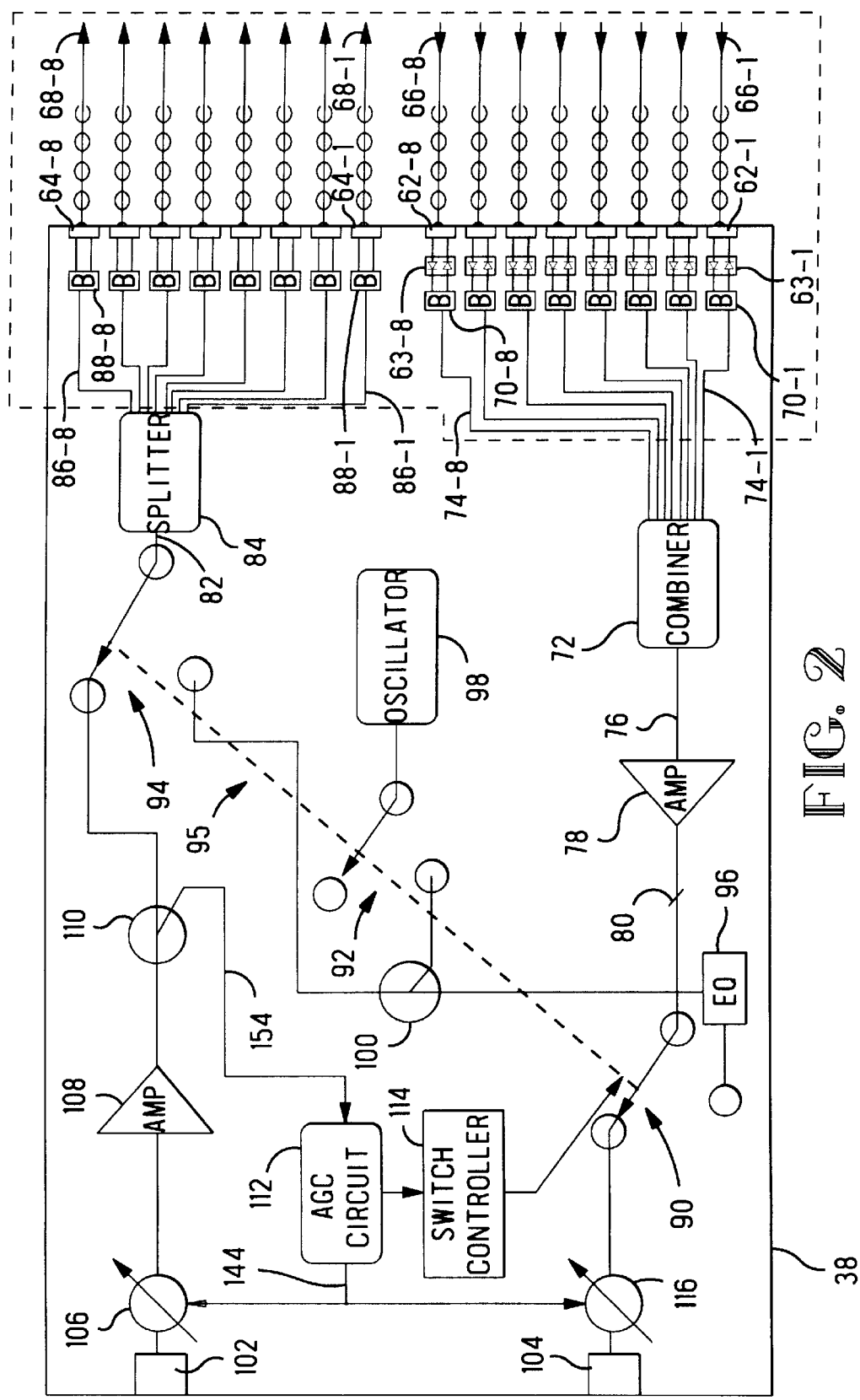
FIG. 2 shows a block diagram of a distribution unit for use in the system of FIG. 1.

Referring to FIG. 2, a block diagram is shown of a distribution unit 60 which may be utilized in the system shown in FIG. 1. The distribution unit 60 includes eight input ports: 62-1, 62-2, 62-3, 62-4, 62-5, 62-6, 62-7, 62-8, and eight ouput ports: 64-1, 64-2, 64-3, 64-4, 64-6, 64-7, 64-8. Each of the ports 62, 64 is adapted for connection to the two wires of a respective twisted pair 66, 68. The incoming signals at the input port 62 are balanced signals transmitted over twisted pair cable which are coupled through respective baluns 70-1, 70-2, 70-3, 70-4, 70-5, 70-6, 70-7, 70-8 to a combiner circuit 72. The combiner circuit 72 serves to additively combine, in a passive manner, all of the signals appearing at its inputs 74-1 through 74-8 and provide a combined additive signal on its output lead 76. The output lead 76 is connected to the input of the amplifier 78, whose output lead 80 is connected to one part of the master/slave switch.

The combined additive signal consisting of each of the eight inputs from the combiner is then supplied through the input lead 82 to the splitter circuit 84 in unmodified form except for some attenuation through the splitter 84. These signals are provided as inputs to the respective baluns 88-1 through 88-8, which provide balanced signals to the output ports 64-1 through 64-8 for subsequent transmittal in balanced form over the twisted pair cable 68-1 through 68-8.

FIG. 2 also illustrates the master/slave switch as having three parts, 90, 92, 94, with all of the switch parts being shown here in the slave configuration. It will be recalled from FIG. 1 that these distribution units may be cascaded when more than eight outlets 26 are necessary in a system. In such a configuration the first distribution unit 38 is said to be in master mode and all subsequent cascaded units 52, 54 are said to be in slave mode. The default state therefore of the master/slave switch is its master position, so that the amplifier output 80 is coupled through the switch part 90 to a transmission path 95 including the equalizer 96, which connects the amplifier output 80 to the splitter input 82, through the switch parts 90, 94. At the same time, the switch part 92 couples the output of the oscillator circuit 98 to the transmission path 95 through the directional coupler 100. Thus, when the distribution unit 60 is operated in the master mode, the signals appearing at the input ports 62 are combined, looped back, combined with an oscillator signal, and transmitted out all of the output ports 64. Cascaded slave distribution units 52, 54 are designed to automatically sense the oscillator circuit 98 output of the master distribution unit 38, and automatically switch into slave mode by actuating the master/slave switch parts 90, 92, 94 such that they are in the position shown in FIG. 2.

Figure 3:
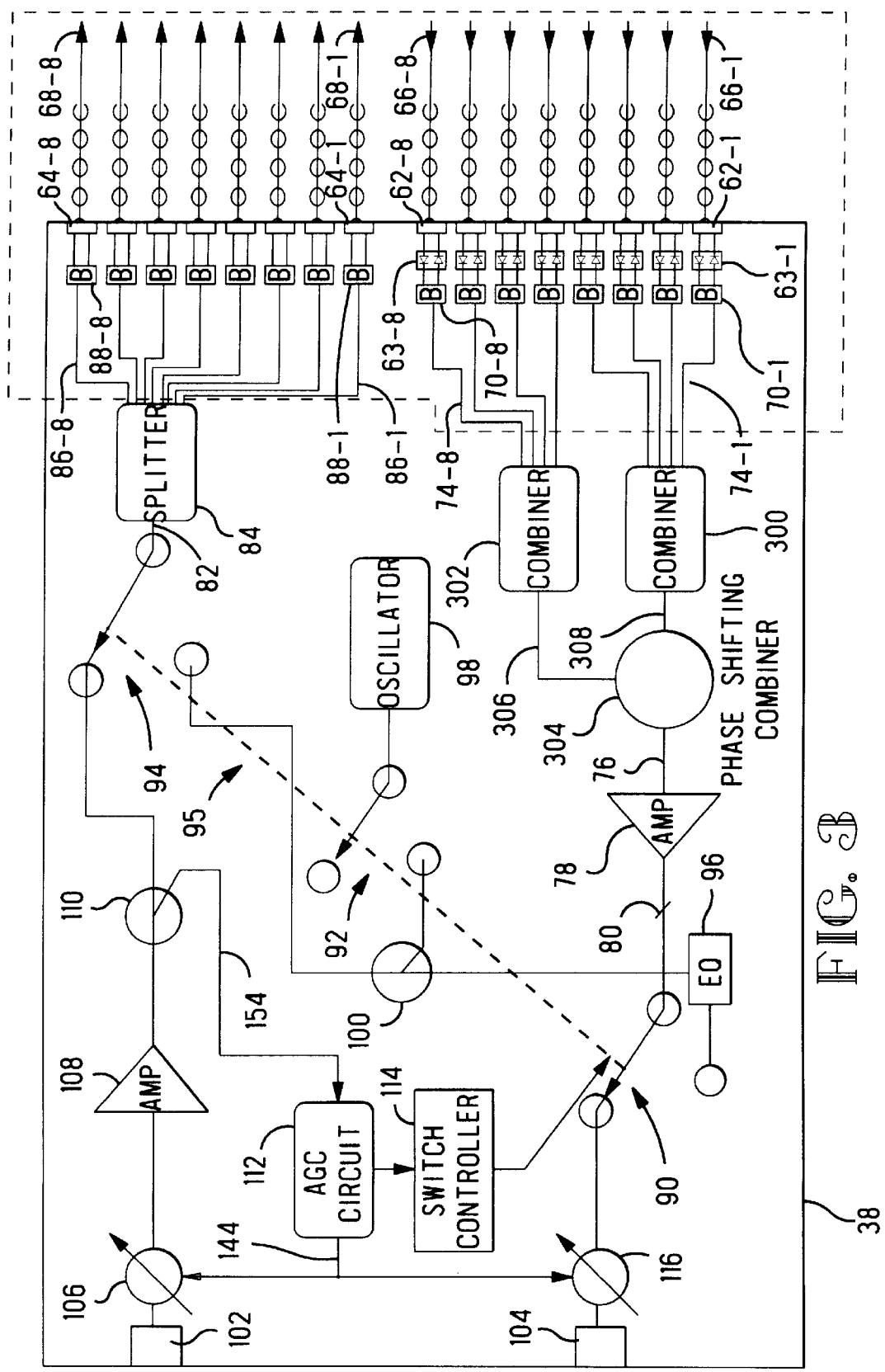
FIG. 3 shows a block diagram of a preferred distribution unit according to this invention.

A preferred embodiment of the distribution unit for use in the system of FIG. 1 is shown in FIG. 3 and will now be described in greater detail. This distribution unit design presents an improvement over that shown in FIG. 2 because here two combiners 300, 302 and a phase-shifting combiner 304 are provided at the input ports 62. The first combiner 300 serves to additively combine in a passive manner each of the signals appearing at input ports 74-1, 74-2, 74-3, 74-4. This additively combined signal is then supplied at zero phase to the phase shifting combiner 304. Similarly the second combiner 302 serves to additively combine in a passive manner all of the signals appearing at its input 74-5, 74-6, 74-7, 74-8. This additively combined signal from the second combiner 302 is supplied to the phase-shifting combiner 304 at 180° out of phase with the combined signal coming from the first combiner 300. The zero phase and phase-shifted signals are then combined at the phase-shifting combiner 304 and supplied to the output lead 76 which is connected to the input of the amplifier 78. The remainder of the video distribution unit is exactly the same as that described earlier with reference to FIG. 2.

Figure 4:
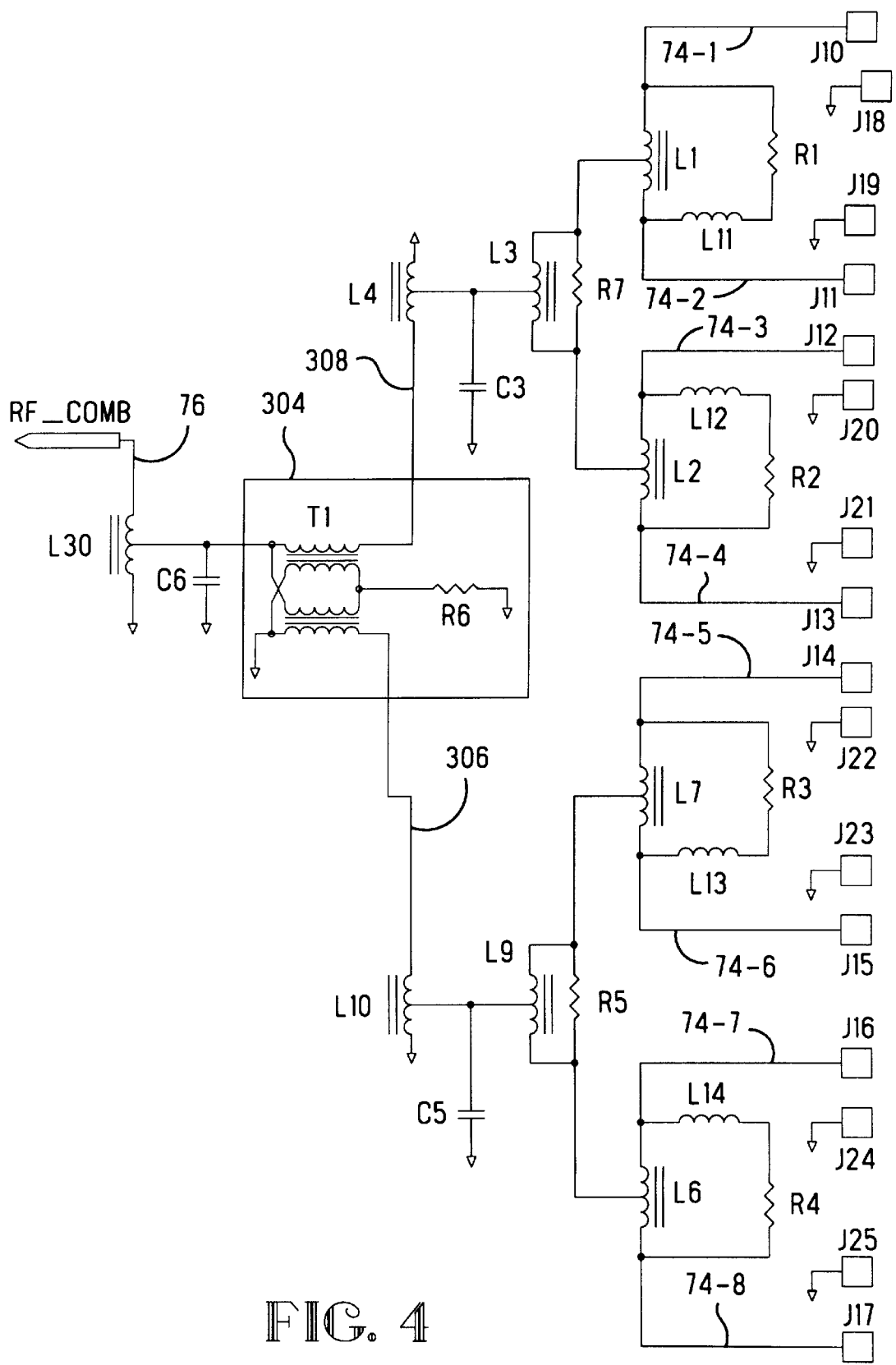
FIG. 4 shows a detailed electrical schematic circuit diagram of the phase-shifting combiner according to this invention.

Referring to FIG. 4 the combiners 300, 302 and the phase-shifting combiner 304 will be described in greater detail. This circuit schematic shows illustrative circuitry which may be utilized for these combiners 300, 302, 304. The first inputs 74-1, 74-2, 74-3, 74-4 are supplied to a passive network which combines these four input signals into an additive signal which is supplied to line 308 at zero degrees. Similarly inputs 74-5, 74-6, 74-7 and 74-8 are supplied to a passive network which combines these signals to form the additive signal supplied to the output 306. Both lines 306 and 308 feed into a phase-shifting combiner 304 which serves to add a 180° phase shift to the signal coming in on line 306. Phase-shifting combiner 304 also allows the input coming in on line 308 to pass without any phase shift. The combined signal exits the phase-shifting combiner on line 76 where it will pass to the amplifier 78.

The advantage of this invention is that the phase splitting combiner reduces the power of unwanted crosstalking signals.

We claim:

1. A wideband signal distribution system for receiving a plurality of inputs and having a plurality of outputs, the distribution system being characterized by:

a first distribution unit having a first combiner, a second combiner and a phase shifting combiner;

said first combiner being connected to a first subset of the plurality of inputs and having a first output terminal to which is applied a first combined signal which is an additive combination of said first subset of the plurality of inputs;

said second combiner being connected to a second subset of the plurality of inputs and having a second output terminal to which is applied a second combined signal which is an additive combination of said second subset of the plurality of inputs;

said phase shifting combiner having inputs each connected to the first and second output terminals of the first and second combiners, respectively, wherein the phase shifting combiner applies a non-zero phase shift to said first combined signal, and the phase shifting combiner combines the first combined signal having the non-zero phase shift with the second combined signal having a zero phase shift to provide a third combined signal at an output of said phase shifting combiner, said output of said phase shifting combiner being connected to a splitter, said splitter being connected to a plurality of first distribution unit outputs; and a second distribution unit cascaded with the first distribution unit such that at least one of the signal distribution unit outputs from the first distribution unit is coupled to an input of the second distribution unit.

2. The wideband signal distribution system as recited in claim 1 where in the non-zero phase shift is 180 degrees.

3. A wideband signal distribution system, the distribution system comprising:

(a) a first distribution unit including (i) a plurality of input ports each adapted to be connected to a respective one of a plurality of cables;

(ii) a plurality of impedance matching devices each having its balanced end connected to a respective one of said input ports;

(iii) a first combiner having a first plurality of input terminals each connected to the unbalanced end of one of a first subset of said plurality of impedance matching devices and having an output terminal to which is applied a first combined signal which is an additive combination of all signals appearing at said first plurality of input terminals;

(iv) a second combiner having a second plurality of input terminals each connected to the unbalanced end of one of a second subset of said plurality of impedance matching devices and having an output terminal to which is applied a second combined signal which is an additive combination of all signals appearing at said second plurality of input terminals;

(v) a phase shifting combiner having input terminals each connected to the respective output terminals of the first and second combiners, the phase shifting combiner applying a non-zero phase shift to the first combined signal and combining the first combined signal having the non-zero phase shift with the second combined signal having a zero phase shift to provide a third combined signal at an output of said phase shifting combiner;

(vi) a splitter having an input terminal coupled to the output of the phase shifting combiner by a transmission path, and a plurality of output terminals to all of which is applied the third combined signal appearing at the splitter input terminal;

(vii) a second plurality of impedance matching devices each having its unbalanced end connected to a respective one of said splitter output terminals;

(viii) a plurality of output ports each connected to the balanced end of a respective one of said second plurality of impedance matching devices;

(b) a second distribution unit cascaded with the first distribution unit such that at least one of the output ports from the first distribution unit is coupled to an input of the second distribution unit.

* * * * *